United States Patent Office 3,801,583
Patented Apr. 2, 1974

3,801,583
DERIVATIVES OF 2-MERCAPTO-PYRIDO[1,2-b]-1,2,4-THIADIAZOLIUM SALTS
Roger Lawrence Newton Harris, Aranda, Australian Capital Territory, Australia, and Rüdiger Spaun, Bottmingen, Switzerland, assignors to Ciba-Geigy Corporation, Ardsley, N.Y.
No Drawing. Filed Nov. 29, 1972, Ser. No. 310,529
Claims priority, application Switzerland, Dec. 1, 1971, 17,461/71
Int. Cl. C07d 31/50
U.S. Cl. 260—294.8 C
6 Claims

ABSTRACT OF THE DISCLOSURE

New derivatives of 2 - mercapto-pyrido[1,2-b]-1,2,4-thiadiazolium salts of the formula

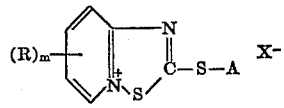

wherein
R represents hydrogen, halogen, nitro, alkyl or alkoxy;
$m$ denotes 1 or 2;
A stands for an optionally substituted straight-chain or branched alkyl radical or an optionally substituted phenylalkyl; and
X represents the anion of a non-toxic acid having a broad range anthelmintic action, process for their production, anthelmintic compositions containing a thiadiazolium salt of the above formula and the use of thiadiazolium salts of the above formula for the control of parasitic helminthes.

---

The present application relates to new derivatives of 2-mercapto-pyrido[1,2-b]-1,2,4-thiadiazolium salts, to a process for the production of these new compounds, to their application for the control of parasitic helminthes, and to anthelminthic agents containing as active substances the new compounds.

Among the endoparasites occurring in the case of warm-blooded animals, the helminthes, in particular, cause considerable damage. For example, animals infested by worms suffer not only to the extent of retarded growth but, in some cases, to the entent of damage so severe that the animals die as a result. It is therefore of great importance that agents be developed which are suitable for the control of helminthes and of their development stages, as well as for the prevention of infestation by these parasites. By the term "helminthes" in the present description are meant nematodes, cestodes and trematodes, that is, worms of the gastrointestinal tract, of the liver and of other organs. There is indeed a number of substances known which have an anthelminthic action; however, these are frequently not fully satisfactory for the given purpose: it may be that they have an insufficient action in compatible dosages, cause in thereapeutically effective dosage levels undesired secondary effects, or have too narrow a range of action. Thus, for example, d,1-2,3,5,6 - tetrahydro - 6 - phenyl - imidazo(2,1-5)-thiazole, known from the Dutch Pat. No. 6505806, is effective only against nematodes, not, however, against trematodes and cestodes.

It has now been found that derivatives of 2-mercaptopyrido[1,2-b]-1,2,4-thiadiazolium salts of Formula I

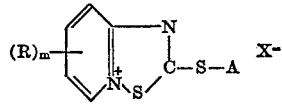

wherein
R represents hydrogen, halogen, nitro, linear lower alkyl or linear lower alkoxy;
$m$ is 1 or 2;
A stands for a straight-chain or branched alkyl radical having 1–12 carbon atoms, which can be substituted by dialkylamino, alkoxy or alkylthio, with the alkyl groups present in these radicals having in each case 1–4 carbon atoms, or for an aralkyl radical of the formula

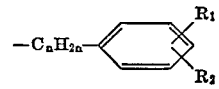

wherein $n$ denotes 1–3, and $R_1$ represents hydrogen, halogen, nitro, trifluoromethyl, alkyl, alkoxy, alkylthio each having 1–4 carbon atoms, phenoxy or phenylthio, and $R_2$ represents hydrogen, halogen, nitro, trifluoromethyl, alkyl, alkoxy and alkylthio each having 1–4 carbon atoms, and X⁻ represents the anion of a non-toxic inorganic or organic acid, constitute valuable anthelmintics possessing a broad range of action. The compounds of Formula I are particularly effective against nematodes, cestodes and trematodes, and produce, in the doses to be applied, no undesirable side effects.

As halogen is Formula I, R, denotes, in particular, chlorine or bromine. As an alkyl group, R preferably contains 1–4 carbon atoms, while as an alkoxy group, R can have 1–10 carbon atoms.

As a phenylalkyl group, the substituent A of the General Formula I embraces the benzyl group, the α- or β-phenylethyl group, the α-, β- or γ-phenylpropyl group, as well as the α-methyl-β-phenyl-ethyl group. As halogen, the substituent $R_1$ on the phenyl radical of these groups represents fluorine, chlorine, bromine or iodine. $R_1$ as an alkoxy or alkylthio group has at most 4 carbon atoms.

The symbol X⁻ denotes, in particular, the anion of hydrochloric acid, hydrobromic acid, hydriodic acid, sulphuric acid, phosphoric acid, perchloric acid, the anion of an alkyl- or arylsulphonic acid, e.g. methanesulphonic acid or p-toluenesulphonic acid, acetic acid, lactic acid, malic acid, tartaric acid, citric acid, maleic acid, fumaric acid, benzoic acid or embonic acid.

With regard to their anthelmintic action, those compounds of Formula I are to be particularly emphasized in which A represents a phenylalkyl group.

The compounds of Formula I are produced according to the invention by the treatment of N - (2 - pyridyl)-dithiocarbamic acid ester of Formula II

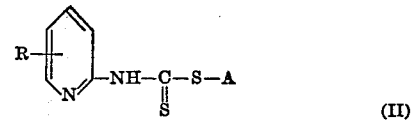

(II)

wherein R and A have the meanings given under Formula I with an oxidizing agent in an inert solvent.

Preferably, sulphuryl chloride or bromine are used as the oxidizing agent. Other oxidizing agents can however be used, e.g. iodine or lead tetraacetate.

Suitable inert solvents are, in particular, chlorinated hydrocarbons, e.g. methylene chloride, chloroform, carbon tetrachloride, trichloroethylene, as well as alcohols, e.g. methanol, ethanol, isopropanol, also organic acids, e.g. acetic acid. The use of glacial acetic acid as solvent is to be particularly recommended in the case where the oxidation is to be performed with bromine or with lead tetraacetate.

It is preferable for equivalent amounts of oxidation agent to be used for the oxidation process.

The reaction temperatures are between 0° C. and the reflux temperature of the reaction mixture, preferably 20–25° C.

The separation of the final product is in most cases very simple since the 2-mercapto-pyrido[1,2 - b] - 1,2,4-thiadiazolium salts formed in the oxidation process according to the invention are frequently difficultly soluble in the aforementioned solvents, and therefore crystallize out directly. In cases where the formed thiadiazolium salt is soluble in the employed solvent, isolation can be effected by conversion of the thiadiazolium salt into an aqueous solution—for example, by extraction with water, or evaporation of the solvent and taking up of the residue with water—and precipitation of the salt as perchlorate from the solution by the addition of a water-soluble perchlorate, e.g. sodium perchlorate.

The N-(2 - pyridyl) - dithiocarbamates of Formula II which are used as starting materials are obtained, in a manner known per se, by reaction of 2-aminopyridine with carbon disulphide in the presence of a base, e.g. triethylamine, to give the corresponding N-(2-pyridyl)-dithiocarbamic acid salt of the employed base, and subsequent reaction thereof with a halide derived from the radical A according to the above definition.

Of the compounds of Formula II, the only ones hitherto known were N-(2-pyridyl)-S - methyldithiocarbamate, N-(2-pyridyl)-S-ethyldithiocarbamate, N - (2 - pyridyl)-s-benzyldithiocarbamate, N-[2-(4 - methyl - pyridyl) - s-methyldithiocarbamate and N-[2-(6-methyl - pyridyl) - s-methyldithiocarbamate. The remaining compounds embraced by Formula II are new.

The reaction according to the invention of N-(2-pyridyl)-dithiocarbamates of Formula II takes a surprising course. It is known that N-phenyl-N'-substituted thioureas react in the case of oxidation with bromine or sulphuryl chloride according to the equation:

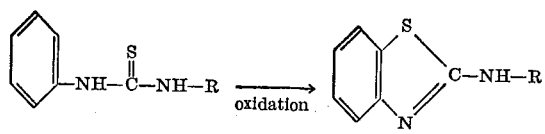

to give N-substituted 2-aminobenzothiazoles (Hugerschoff-reaction, cp. A. Hugerschoff, Ber. Dtsch. Chem. Ges., 34, 3130 (1901)).

In an analogous manner, N-(4-pyrimidyl)-thioureas react under similar conditions according to the equation:

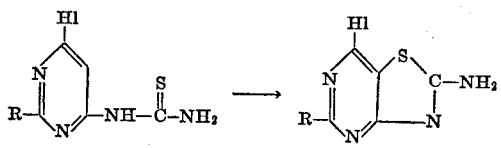

to give 2-amino-pyrimido-thiazoles (cp. G. Barmikow and J. Bodeker, Z. Chem., 5, 62 (1965), as well as A. Maggiolo and G. H. Hitchings, J. Amer. Chem. Soc., 73, 4226 (1951)). It was therefore not to be anticipated that in the case of the analogously performed oxidation of N-(2-pyridyl)-dithiocarbamates of Formula II according to the present invention pyrido[1,2-b]-1,2,4-thiadiazolium salts of Formula I would be obtained.

The new compounds are colorless crystalline substances which are stable under normal conditions. They are difficultly soluble in most conventional organic solvents, and in some cases also in water.

The new pyrido[1,2b]-1,2,4-thiadiazolium salts of Formula I have a pronounced anthelmintic action against the most important of the nematodes which infest animals and humans (e.g. ascaridae, trichostrongylidae, ancyclostomatidae, strongylidae), cestodes (e.g. anoplocephalidae, taeniidae) and trematodes (e.g. fasciolidae, schistosomidae). The control of helminthes is of particular importance in the case of domestic and useful animals, such as, e.g. cattle, pigs, horses, sheep, goats, dogs, cats, as well as poultry. The active substances according to the invention can be administered to the said animals either in the form of a single dose or in the form of repeated doses. A better action is obtained in some cases by a protracted form of administration, or it is possible to obtain the desired effect with smaller overall doses. The active substances or mixtures containing them can also be added to the feed or to the drinking water, the active substance concentrations being then between 0.01 and 1%.

The new active substances can be administered in the form of solution, emulsions, suspensions (drenches), powders, tablets, boluses and capsules to the animals direct, the administration being effected, orally or abomasally, either as a single dose or as repeated doses. A better effect is achieved in some cases by a protracted administration, or, on the other hand, smaller amounts administered as overall doses may suffice. The active substances or mixtures containing them can also be added to the feed or to the water, or can be contained in so-called feed premixtures.

The usual solid carriers are used to produce the preparations; for example, solid carriers such as kaolin, talcum, bentonite, sodium chloride, calcium phosphate, carbohydrates, cellulose powder, cottonseed meal, carbowaxes, gelatine, or liquids such as water, optionally with the addition of surface-active substances such as ionic or nonionic dispersing agents, as well as oils, and other solvents harmless to the animal organism. If the anthelminthic agents are in the form of feed concentrates, then it is possible to use as carriers, e.g. production feed, fodder grain or protein concentrates. Such feed concentrates may contain, in addition to the active substances, also additives, vitamines, antibiotics, chemotherapeutical agents, bacteriostatic, fungistatics, coccidiostatics, hormone preparations, substances having anabolic activity, or other substances promoting growth, influencing the quality of meat of slaughter cattle, or useful in some other way for the organism.

Suitable dosage units for oral administration, such as dragées or tablets, preferably contain 100 to 500 mg. of the active substance according to the invention, i.e. 20 to 80% of a compound of the General Formula I.

The said dosage units are produced by the combination of the active substance, e.g. with solid pulverulent carriers such as lactose, saccharose, sorbital, mannitol, starches such as potato starch, maize starch or amylopectin, also laminaria powder or citrus pulp powder, cellulose derivatives or gelatine, optionally with the addition of lubricants such as magnesium or calcium stearate, or polyethylene glycols, to form tablets or dragée cores. The last-mentioned are coated, e.g. with concentrated sugar solutions which can also contain, e.g. gum arabic, talcum and/or titanium dioxide, or with a lacquer dissolved in readily volatile organic solvents or solvent mixtures. Dyestuffs may be added to these coatings, e.g. for the identification of the various dosages of active substance.

The compounds according to the invention can be used, for the production of anthelminthic agents, either on their own or in combination with other anthelminthically effective substances. Such substances are as follows: as nematocides, e.g. Absonal, Alcopar, Anthelcide, Ascaridole, Banminth II, Bephenium, Bradosol, Cambendazol, Chlorophos, Chlorthion, Coumaphos, Cyanin, Destomycin, Diethylcarbamazine, Dichlorophene, DDVP, 1,4-di-(D-glucosyl)-piperazine, Dithiazonin, Dow ET/70 Dowco 132, Dimanthine HCl, Egressin, Gainex, Hexachlorophene, Hexylresorcinol, Ionit, Levamisol, Mepacrine, Methylene violet, 1 - Methyl - 1-tridecylpiperazinium-4-carboxylic acid ethyl ester, Methyridine, Monopar Narlene, Neguvon, Nematodin, Nemural, Nidanthel, Parbendazol, Parvex Phenothiazine, Piperazine, Polymethylene-piperazine, Promethazine, Pyrantel, Pyrathiazine, Pyrvinium embonate, Rametin, Ronnel, Santonin Shell 808, Stilbazium, Tetramisole Thenium, Thiabendazole, Thymolan, Triclopenol, Triclofenol-piperazine, Vermella; as trematocides, e.g. Acedist Bilevon M, Bilevon R, Bithionol, Disophenol, Freon 112, Hetol, Hetolin, Hexachloroethane, Hexachlorophen Hilomid, Niclofolan, Nitroxynil, Ranide, Tremerad, Tribomsalan (Tremasept II), Zanil; and as cestocides, e.g. Acranil, Arecoline, Atebrin, Bithionol, Bithionol oxide, Bunamidine, Cestodin, Cambendazol, Dibutyltin dilaurate, Dichlorophen, Dioctyltin dichloride, Dioctyltin laurate, Doda, Filixic acid, Hexachlorophene, Nidanthel, Terenol, Yomesan.

The production of the active substances according to the invention is described in the following examples.

EXAMPLE 1

An amount of 1.5 ml. of sulphuryl chloride is added dropwise at room temperature, with stirring, to a solution of 3.5 g. of N-(2-pyridyl)-s-methyldithiocarbamate; and, after the addition, stirring is continued for 1.5 hours. The thiadiazolium salt which has crystallized out is then filtered off, washed with chloroform and diethyl ether, and dried in air. There is subsequently obtained, by recrystallization from methanol/benzene, 3.5 g. of 2-methylthiopyrido[1,2-b] - 1,2,4 - thiadiazolium chloride, M.P.: 238–241° C. (decomposition) (Compound 1).

The preparation of the starting materials of Formula II is described below with the example of N-(2-pyridyl)-S-methyldithiocarbamate. Other compounds of Formula II can be produced analogously.

(a) Preparation of the salts of dithiocarbamic acid

A mixture of 18.8 g. of 2-aminopyridine and 12 ml. of carbon disulphide with 30 ml. of triethylamine is stirred at 40° C. for 30–40 minutes. After the formation of 2 clear phases, stirring is carried out at room temperature for 1.5 hours. Diethyl ether is added to the crystal mass which has formed during this time; the crystals are then filtered off and washed with diethyl ether. Recrystallization from ethanol/diethyl ether yields 37.8 g. of light-yellow crystals having a melting point of 83–85° C.

(b) Preparation of the esters of dithiocarbamic acid

An amount of 13.5 g. of triethylammonium salt of N-(2-pyridyl)-dithiocarbamic acid is suspended in 60 ml. of ethanol. An addition is made within 15 minutes, with stirring, of the solution of 3.1 ml. of methyl iodide in 10 ml. of ethanol, as a result of which a clear half-yellow solution is obtained. After completion of the addition, the solution is stirred for several hours at room temperature. Dithiocarbamate is precipitated by the addition of water; the dithiocarbamate is filtered off and, after drying, recrystallized from ethanol to obtain 7.3 g. of N-(2-pyridyl)-S-methyldithiocarbamate, M.P. 89–91° C.

EXAMPLE 2

An amount of 1.8 g. of N-(2-pyridyl)-s-methyldithiocarbamate is dissolved in 40 ml. of glacial acetic acid. To this solution there is added dropwise, within 10 minutes, the solution of 0.5 ml. of bromine in 10 ml. of glacial acetic acid; after completion of the addition, stirring is carried out for 10 minutes at room temperature. The thiadiazolium salt which has crystallized out is filtered off; it is first washed with a little glacial acetic acid and then with diethyl ether. There is obtained, after drying in air, 2.4 g. of 2-methylthiopyrido[1,2-b]-1,2,4-thiadiazolium bromide, M.P. 185–188° C. (decomposition) (Compound 2).

EXAMPLE 3

The following compounds are obtained by methods analogous to those described in Examples 1 and 2:

Compound (3) 2-benzylthio-pyrido[1,2-b]-1,2,4-thiadiazolium chloride, M.P. 188–190° C. (decomposition);
(4) 2-ethylthio-pyrido[1,2-b]-1,2,4-thiadiazolium perchlorate, M.P. 144–149° C. (decomposition);
(5) 2-(4'-nitro-benzylthio)-pyrido[1,2-b]-1,2,4-thiadiazolium chloride, M.P. 178–180° C. (decomposition);
(6) 2-(4'-fluorobenzylthio)-pyrido[1,2-b]-1,2,4-thiadiazolium chloride, M.P. 200–203° C. (decomposition);
(7) 2-methylthio-methylthio)-pyrido[1,2-b]-1,2,4-thiadiazolium chloride;
(8) 2-(2'-dimethylamino-ethylthio)-pyrido[1,2-b]-1,2,4-thiadiazolium chloride;
(9) 2-(2'-phenyl-ethylthio)-pyrido[1,2-b]-1,2,4-thiadiazolium chloride, M.P. 171–175° C. (decomposition);
(10) 2-(4'-phenoxy-benzylthio)-pyrido[1,2-b]-1,2,4-thiadiazolium bromide;
(11) 2-n-hexylthio-7-methyl-pyrido[1,2-b]-1,2,4-thiadiazolium bromide;
(12) 2-benzylthio-7-methyl-pyrido[1,2-b]-1,2,4-thiadiazolium chloride;
(13) 2-methoxymethylthio-7-methyl-pyrido[1,2-b]-1,2,4-thiadiazolium chloride;
(14) 2-methylthio-5-methyl-pyrido[1,2-b]-1,2,4-thiadiazolium bromide;
(15) 2-(2'-methyl-benzylthio)-5-methyl-pyrido[1,2-b]-1,2,4-thiadiazolium bromide;
(16) methylthiomethylthio-5-methyl-pyrido[1,2-b]-1,2,4-thiadiazolium chloride;
(17) 2-n-hexylthio-5-methyl-pyrido[1,2-b]-1,2,4-thiadiazolium chloride;
(18) 2-methylthio-6-chloropyrido[1,2-b]-1,2,4-thiadiazolium chloride;
(19) 2-(4'-methyl-benzylthio)-6-chloropyrido[1,2-b]-1,2,4-thiadiazolium chloride;
(20) 2-(3'-methyl-butylthio)-6-chloropyrido[1,2-b]-1,2,4-thiadiazolium chloride;
(21) 2-methylthio-5,7-dimethyl-pyrido[1,2-b]-1,2,4-thiadiazolium chloride;
(22) 2-benzylthio-5,7-dimethyl-pyrido[1,2-b]-1,2,4-thiadiazolium chloride;
(23) 2-(3',4'-dichlorobenzylthio)-5,7-dimethyl-pyrido[1,2-b]-1,2,4-thiadiazolium chloride;
(24) 2-(3'-methyl-butylthio)-5,7-dimethyl-pyrido[1,2-b]-1,2,4-thiadiazolium chloride;
(25) 2-methylthio-4-methyl-pyrido[1,2-b]-1,2,4-thiadiazolium chloride;
(26) 2-benzylthio-4-methyl-pyrido[1,2-b]-1,2,4-thiadiazolium chloride;
(27) 2-(4'-nitro-benzylthio)-4-methyl-pyrido[1,2-b]-1,2,4-thiadiazolium chloride;
(28) 2-(2'-methylthio-ethylthio)-4-methyl-pyrido[1,2-b]-1,2,4-thiadiazolium chloride;
(29) 2-methylthio-6-methyl-pyrido[1,2-b]-1,2,4-thiadiazolium chloride;
(30) 2-methoxymethylthio-6-methyl-pyrido[1,2-b]-1,2,4-thiadiazolium chloride;
(31) 2-(3'-chloropropylthio)-6-methyl-pyrido[1,2-b]-1,2,4-thiadiazolium chloride;
(32) 2-(2'-phenyl-ethylthio)-6-methyl-pyrido[1,2-b]-1,2,4-thiadiazolium chloride;
(33) 2-ethylthio-6-nitro-pyrido[1,2-b]-1,2,3-thiadiazolium chloride;
(34) 2-(3'-methyl-benzylthio)-6-nitro-pyrido[1,2-b]-1,2,4-thiadiazolium chloride;
(35) 2-(4'-fluorobenzylthio-6-nitro-pyrido[1,2-b]-1,2,4-thiadiazolium chloride;
(36) 2-(2'-methylthio-ethylthio)-6-nitro-pyrido[1,2-b]-1,2,4-thiadiazolium chloride;

(37) 2-propylthio-4-nitro-7-chloro-pyrido[1,2-b]-1,2,4-thiadiazolium chloride;
(38) 2-benzylthio-4-nitro-7-chloro-pyrido[1,2-b]-1,2,4-thiadiazolium chloride;
(39) 2-methoxymethylthio-4-nitro-7-chloro-pyrido-[1,2-b]-1,2,4-thiadiazolium chloride;
(40) 2-benzylthio-4-(3'-dimethylamino-propoxy)-pyrido-[1,2-b]-1,2,4-thiadiazolium chloride;
(41) 2-(4'-trifluoromethyl-benzylthio)-pyrido[1,2-b]-1,2,4-thiadiazolium chloride;
(42) 2-(4'-methoxy-benzylthio)-pyrido[1,2-b]-1,2,4-thiadiazolium chloride;
(43) 2-(4'-methylthio-benzylthio)-pyrido[1,2-b]-1,2,4-thiadiazolium chloride;
(44) 2-(4'-phenylthio-benzylthio)-pyrido[1,2-b]-1,2,4-thiadiazolium chloride;
(45) 2-(3',4'-dichlorobenzylthio)-pyrido[1,2-b]-1,2,4-thiadiazolium chloride, M.P. 205–210° C. (decomposition);
(46) 2-n-hexylthio-pyrido[1,2-b]-1,2,4-thiadiazolium chloride, M.P. 141–146° C.

A number of tests for the determination of the anthelminthic effectiveness of the new pyrido[1,2-b]-1,2,4-thiadiazolium salts of Formula I are described below.

Tests on mice infested by Nematospiroides dubius

The active substances in the form of a suspension were administered by a stomach probe to white mice which had been artificially infested with Nematospiroides dubius. Five animals per test were used. The active substances were administered to each group of animals once daily on three successive days. On the eighth day after commencement of the treatment, the animals were killed and dissected.

After dissection of the test animals, an evaluation was made on the basis of the count of the number of worms present in the intestines. As a control, untreated mice were examined which had been simultaneously and identically infested.

The agents were tolerated asymtomatically by the mice.

The compounds according to the invention showed a high degree of effectiveness, particularly 2-benzylthio-pyrido[1,2-b]1,2,4-thiadiazolium chloride.

Tests on mice infested by Hymenolepsis nana

The active substances in the form of a suspension were administered by stomach probe to white mice artificially infested with Hymenolepsis nana. Five animals per test were used. The active substances were adminstered to each group of animals once daily during 3 successive days. On the eighth day after commencement of the treatment, the animals were killed and dissected.

After dissection of the test animals, an evaluation was made on the basis of a count of the tapeworms present in the intestines. As a control, an examination was carried out too on untreated mice which had been simultaneously and identically infested.

Tests on rats infested by Fasciola hepatica

White laboratory-rats were infested artificially with common liver flukes (Fasciola hepatica). After expiration of the prepatent period, the infestation of the rats by common liver flukes was determined by means of three independent excrement analyses.

In each test, a group of four infested rats was treated with the active substance, administered in the form of a suspension by stomach probe, once daily on three successive days. An excrement analysis to determine the content of common liver fluke eggs was made once weekly in the third, fourth and fifty week after administration of the active substance. At the end of the fifth week after commencement of the test, the test animals were killed and examined to determine whether liver flukes were still present.

The compounds according to the invention exhibited a very good action, particularly the compound 2-benzylthio-pyrido[1,2-b]-1,2,4-thiadiazolium chloride.

Tests on mice infested by threadworms (Oxyuris)

The active substances were administered in the form of a suspension by means of a stomach probe to white mice infested with mouse threadworms. Five animals were used for each test. The active substances were administered to each group of animals once daily during three successive days.

The daily dose per animal was 750 mg. of active substance per kg. body weight.

The animals were then killed on the sixth day after commencement of the treatment and dissected. After dissection of the test animals, an evaluation was made on the basis of the count of the number of mouse threadworms present in the intestines. As a control, untreated mice were examined which had been infested in an identical manner.

The agents were tolerated asymtomatically by the mice.

The compounds according to the invention showed a high degree of effectiveness, particularly the compound 2-benzylthio-pyrido[1,2-b]1,2,4-thiadiazolium chloride.

What is claimed is:

1. A derivative of 2-mercapto-pyrido[1,2-b]-1,2,4-thiadiazolium salts of Formula I

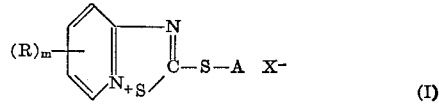

wherein
R represents hydrogen, halogen, nitro, linear lower alkyl or linear lower alkoxy;
m is 1 or 2;
A stands for a straight chain or branched alkyl radical having 1–12 carbon atoms, which can be substituted by dialkylamino, alkoxy or alkylthio, with the alkyl groups present in these radicals having in each case 1–4 carbon atoms, or for an aralkyl radical of the formula

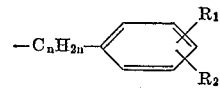

wherein n denotes 1–3, and $R_1$ represents hydrogen, halogen, nitro, trifluoromethyl, alkyl, alkoxy, alkylthio each having 1–4 carbon atoms, phenoxy or phenylthio, and $R_2$ represents hydrogen, halogen, nitro or alkyl, alkoxy or alkylthio each having 1–4 carbon atoms, and $X^-$ represents the anion of a nontoxic inorganic or organic acid.

2. Process for the production of derivatives of 2-mercapto-pyrido[1,2-b]-1,2,4-thiadiazolium salts of Formula I

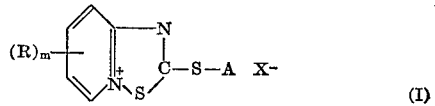

wherein
R represents hydrogen, halogen, nitro, linear lower alkyl or linear lower alkoxy;
m is 1 or 2;
A stands for a straight-chain or branched alkyl radical having 1–12 carbon atoms, which can be substituted by dialkylamino, alkoxy or alkylthio, with the alkyl groups present in these radicals in each case 1–4 carbon atoms, or for an aralkyl radical of the formula

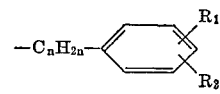

wherein $n$ denotes 1–3, and $R_1$ represents hydrogen, halogen, nitro, trifluoromethyl, alkyl, alkoxy, alkylthio each having 1–4 carbon atoms, phenoxy or phenylthio, and $R_2$ represents hydrogen, halogen, nitro, trifluoromethyl or alkyl, alkoxy or alkylthio each having 1–4 carbon atoms, and $X^-$ represents the anion of a non-toxic inorganic or organic acid, the said process comprising the treatment of N-(2-pyridyl)-dithiocarbamic acid ester of Formula II

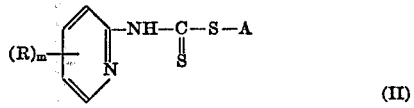

(II)

wherein R, $m$ and A have the meanings given under Formula I, with an oxidizing agent in an inert solvent.

3. Process according to claim 2, wherein the employed oxidizing agent is sulphuryl chloride, bromine, iodine or lead tetraacetate.

4. Process according to claim 2, wherein equivalent amounts of the oxidizing agent are used.

5. Process according to claim 2, wherein the employed inert solvent is chlorinated hydrocarbons, alcohols or aliphatic carboxylic acids.

6. Process according to claim 2, wherein the oxidation is performed at 20–25° C.

References Cited
UNITED STATES PATENTS 3,726,880    4/1973    Capps ---------- 260—294.8 E ALAN L. ROTMAN, Primary Examiner U.S. Cl. X.R.

260—294.8 E; 424—263